A. P. BRUSH.
CONE COUPLING.
APPLICATION FILED APR. 5, 1915.
1,168,246.
Patented Jan. 11, 1916.
2 SHEETS—SHEET 1.
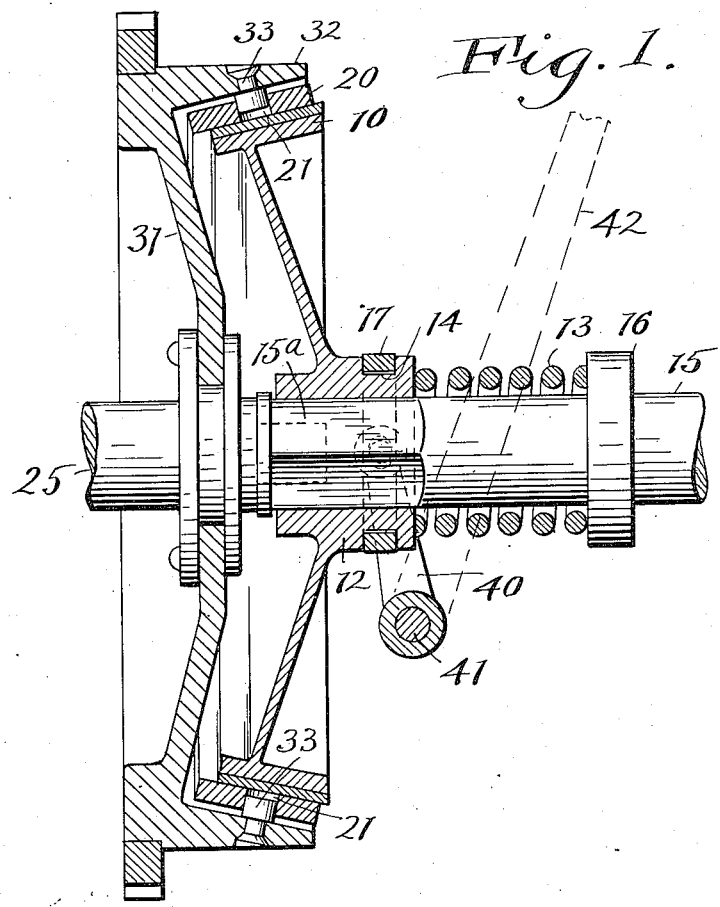

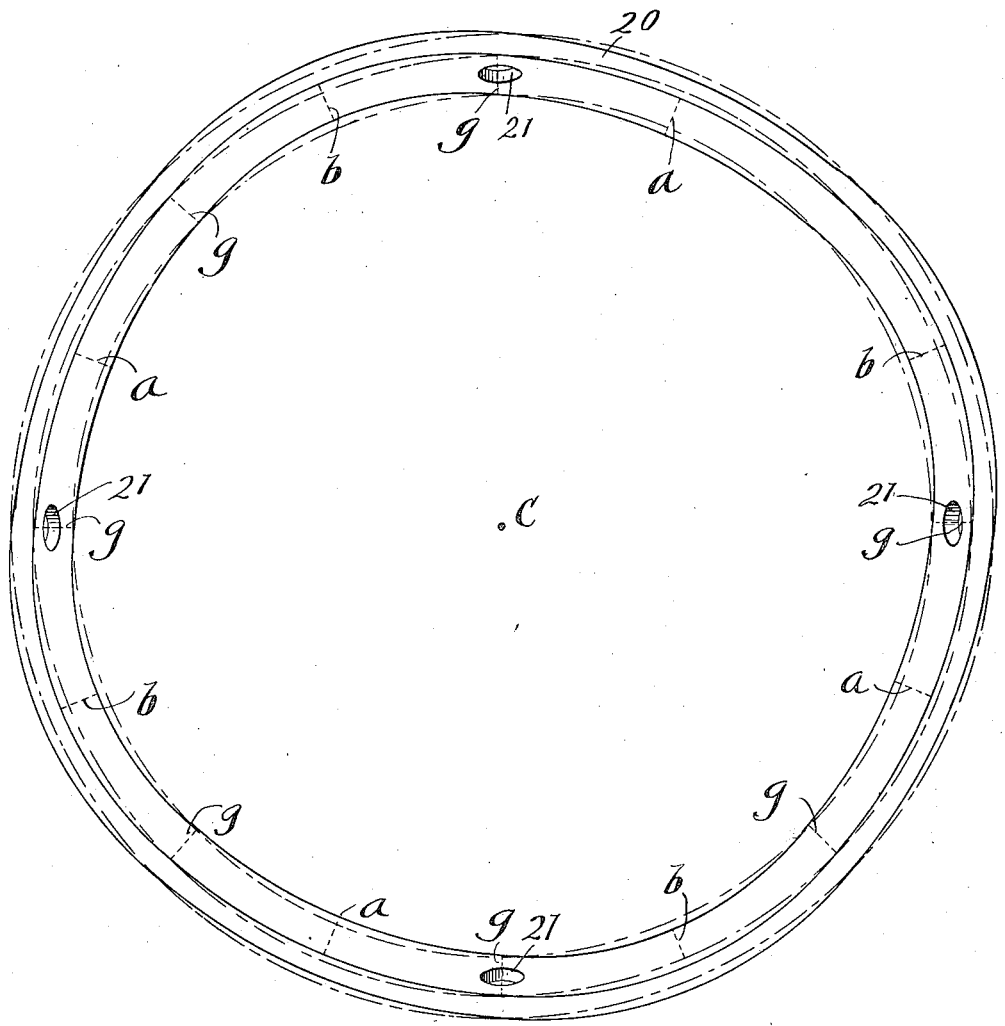

UNITED STATES PATENT OFFICE.

ALANSON P. BRUSH, OF DETROIT, MICHIGAN.

CONE-COUPLING.

1,168,246.
Specification of Letters Patent. Patented Jan. 11, 1916.

Application filed April 5, 1915. Serial No. 19,124.

*To all whom it may concern:*

Be it known that I, ALANSON P. BRUSH, a citizen of the United States, residing at Detroit, in the county of Wayne and State of Michigan, have invented a certain new and useful Improvement in Cone-Couplings, of which the following is a full, clear, and exact description.

This invention relates to friction couplings for frictionally connecting two relatively rotatable members for the purpose of bringing about a common state of rest or of motion, as the case may be. If both of said members are rotatable, the coupling will become specifically a friction clutch, and its function will be to cause said members to rotate in substantial unison. If only one of said members is rotatable, the coupling will become a friction brake, whose function will be to check or entirely stop the rotation of the rotatable member.

The invention is an improvement in the type of friction couplings which are known as cone couplings.

Generally speaking, the object of the invention is to provide a friction cone coupling which does not have the common defects of the ordinary cone coupling; or, more specifically, first, to prevent the coupling from so suddenly connecting the two relatively rotatable members that they will suddenly be brought to a common state of rest or motion, according as the device is in the form of a brake or of a clutch, or, in other words, to prevent the sudden starting of the previously non-rotating member if the invention is in the form of a clutch, or to prevent the sudden stopping of the previously rotating member if the device is in the form of a brake. Second, to prevent the two friction surfaces from sticking together so hard that their separation is either impossible or difficult.

The underlying novel characteristic of the primary invention is the employment in connection with one conical friction member, of a normally warped cone ring, preferably made of steel, and of suitable thickness, whereby said warped cone ring will be bent toward the true cone form by pressure from the conical friction member, but will return to its normally warped form when such pressure is withdrawn.

The invention embodied in a practical form and associated with other mechanism which adapts it specifically for use as a friction clutch is shown in the accompanying drawing, and is hereinafter described, and is formally defined in the appended claims.

In the drawing, Figure 1 is a longitudinal central section of a thoroughly practical embodiment of the invention. Fig. 2 is a front view looking at the large end of the warped cone ring,—but with the warping therein considerably exaggerated.

Referring to the parts by numerals, 10 represents a cone which serves as one of the friction members of the coupling, and this has a driving connection with the rotatable shaft 15; 20 represents a warped cone ring which serves as the other friction member, and this has a driving connection with the alined shaft 25. The cone is adapted to enter the warped cone ring, and their surfaces are adapted to be forced into frictional contact. In order that this may be done one or the other of these two friction members must be axially movable, that is to say, it must be movable in the direction of the axis of rotation of the two shafts.

In the present exemplification of the invention, the hub 12 of the cone 10 has a square hole; and a squared part 15$^a$ of the shaft 15 passes through this hole; and thereby the cone is so supported upon this shaft that they must rotate in unison, but the cone may move lengthwise of the shaft. This cone is under the influence of a spring 13 which is compressed between the hub 12 and a collar 16 on the shaft, and this spring exerts its force to move said cone toward and into contact with the warped cone ring. The hub of the cone may have a circumferential groove 14 in which a collar 17 is rotatably mounted, and this collar may have operatively connected with it a fork lever 40, said lever being fixed to a rock shaft 41, and being provided with an operating lever 42 whereby the rock shaft may be rocked in that direction which will cause the cone to be drawn away from the warped cone ring. This particular manner of mounting the cone, and the particular means for causing its movements toward and from the opposed friction member are not, *per se*, new, nor are they essential to the present invention. Any other suitable construction is permissible.

The warped cone ring 20 has a driving connection with the shaft 25, which may be the crank shaft of a motor. As shown, a fly wheel 31 is fixed to the shaft 25, and this fly wheel has an annular flange 32 within which the warped cone ring lies. Dowel pins 33 fixed to and projecting inward from this flange go into and fit certain holes 21 in the ring 20, and so connect this cone ring and the fly wheel that they must rotate in unison; and likewise they so support the ring that its center of mass is coincident with the axis of rotation of the fly wheel. The outer surface of the ring need not and preferably does not touch the flange 32.

The warped clutch ring is normally so shaped that its inner surface is symmetrically warped from the true conical form. Any number of equal segments of said surface are warped inward, and a like number of intermediately disposed equal segments are warped outward. This can be seen in Fig. 2, although the warping as therein shown is greatly exaggerated as compared with the necessities of the case. In the particular clutch ring shown there are four inwardly warped segments of the inner surface, each of which is indicated by $a$, which reference characters are connected by lead lines with certain dotted lines that indicate the lines at which the inwardly warped segments are nearest to the center of rotation of the ring, (which is indicated by $C$, and is coincident with the axis of shaft 30). The four outwardly warped segments are indicated by $b$, which reference characters are applied to dotted lines which indicate the lines at which said warped segments are at the greatest distance from said center of rotation. Adjacent to the non-circular line $d$ which indicates the inner surface of said warped cone ring at the wide end thereof, is a circular line $e$. By comparing these two lines, one may see in what manner the warped inner surface of the ring is alternately increased and decreased in diameter as compared with a true cone. It is to be understood that in practice it is not necessary that there should be any such degree of warping of this ring as is shown in Fig. 2. In fact, in a 15 inch clutch the outward warping and the inward warping of this ring need not exceed one-twentieth of an inch. The lines $g$ in which the outwardly warped surface segments join the inwardly warped surface segments may be called the neutral lines, and it is on four of these neutral lines that the holes 21 are placed for the reception of the dowel pins 33. The ring is preferably made of steel, and of the same thickness at all parts; and it is of such thickness that the pressure upon the warped inner surface by the male cone 10 can and will bend it toward the true conical form. When this male clutch cone 10 is forced into this warped clutch ring, it will first engage what may be called the high parts of the inwardly warped surface segments; that is to say, the parts of said surface which are nearest the axis of rotation and are indicated by the dotted lines $a$. These parts, however, will be pushed outward by pressure from cone 10, and, as a necessary incident, the outwardly warped segments $b$ will be caused to move inward. These movements will gradually increase the area of the warped surface which is in frictional engagement with the outer conical surface of the cone 10. The friction between these contacting surfaces will, therefore, of necessity be increased, and this increase will be gradual because the bending of the ring, which can not be suddenly produced, is a prerequisite to the production of such a contact between these two surfaces as will produce enough friction to cause the parts by which they are borne to come to a common state of rest or motion as the case may be. When the cone is moved in the contrary direction, the inherent resilience of the cone ring will cause it to resume its normally warped form; and to the extent that it does that, will the area of the friction surfaces in contact be reduced. It is therefore practically impossible that the cone should ever become wedged into or stuck to the cone ring. It will be noted that, because of the symmetrical character of the warping, the center of mass of this clutch ring will not be changed, but will always remain coincident with the center of rotation. It will also be noted that since the dowel pins 13 engage with this clutch ring on the neutral lines, the driving engagement between the clutch ring and the fly wheel will suffer no change as the ring is being bent from its warped condition toward the true conical shape, or when said ring, as the cone 10 is withdrawn therefrom, is again returning to its condition of maximum warping.

Having described my invention, I claim:

1. In a cone coupling, the combination of two relatively rotatable parts, viz., a conical member, and a warped cone ring, and means for forcing the opposed surfaces of these two members into contact with sufficient force to cause the warped cone ring to be bent toward the true conical form.

2. In a cone coupling, the combination of two relatively rotatable parts, viz., a conical member, and a warped cone ring which is symmetrically warped successively away from and toward the axis of rotation, and means for forcing the opposed surfaces of these two members into contact with sufficient force to cause the warped cone ring to be bent toward the true conical form.

3. In a cone coupling, the combination of two relatively rotatable friction members, viz., a cone, and a warped cone-ring,—one of which is capable of movement in the direction of the axis of rotation, and means for moving the same toward and from the other member.

4. In a cone coupling, the combination of two relatively rotatable friction members, viz., a cone, and a warped cone ring,—one of which is capable of movement in the direction of the axis of rotation, a spring acting on said axially movable member to thrust it toward and into contact with the other member, and mechanism for moving said axially movable member in the reverse direction.

5. In a cone coupling, the combination of two relatively rotatable friction members, viz., a cone, and a warped cone ring,—an annular support for said ring, devices which connect said ring with said support at a plurality of separated points, and means for forcing the opposed surfaces of said two friction members into contact with sufficient force to cause the warped cone ring to be bent toward the true conical form.

6. In a cone coupling, the combination of two relatively rotatable parts, viz., a cone, and a warped cone ring, a support for said cone ring which lies outside of and out of contact with said ring, said ring having a plurality of holes, and the supporting device having a plurality of pins which project therefrom into said holes.

7. In a cone coupling, the combination of two relatively movable members, viz., a cone, and a symmetrically warped cone ring, an annular support therefor which lies outside of and out of contact with said cone ring, a plurality of devices which connect said support with said warped cone ring at neutral points thereon, and means for forcing the opposed surfaces of said two friction members into contact.

8. The combination of a rotatable shaft, a fly wheel fixed thereto having an annular flange, a cone ring located within but out of contact with said flange, devices connecting said cone ring and flange at separated points, a cone which normally lies within but out of contact with said cone ring, a spring for moving the cone in the direction to cause it to contact with said cone ring, and means for drawing the cone in the contrary direction.

9. In a cone coupling, the combination of two relatively rotatable friction members, a cone, and a normally warped cone ring made of resilient metal, and of such thickness that pressure against it by said cone will bend said ring toward the true conical form, and its own inherent resilience will cause it to return to its normally warped form when said pressure is withdrawn,—one of said two friction members being capable of movement in the direction of the axis of rotation, and means for moving the same toward and from the other member.

In testimony whereof, I hereunto affix my signature in the presence of two witnesses.

ALANSON P. BRUSH.

Witnesses:
F. L. THURSTON,
A. J. HUDSON.